United States Patent [19]
Wanzer

[11] 3,729,953
[45] May 1, 1973

[54] COUPLING FOR CONNECTING THE ADJACENT ENDS OF SHAFTS

[76] Inventor: Arthur W. Wanzer, 9 Camolot Road, Yarmouth Port, Mass. 02675

[22] Filed: Feb. 17, 1972

[21] Appl. No.: 227,224

Related U.S. Application Data

[63] Substitute for Ser. No. 14,337, Feb. 26, 1970, abandoned.

[52] U.S. Cl. ..................................64/9 A, 64/14
[51] Int. Cl. ......................................F16d 3/18
[58] Field of Search ..................64/9 R, 9 A, 14

[56] References Cited

UNITED STATES PATENTS

| | | | |
|---|---|---|---|
| 1,208,252 | 12/1916 | Westinghouse | 64/9 |
| 1,675,065 | 6/1928 | Thomas | 64/9 A |
| 1,979,306 | 11/1934 | Banner | 64/9 A |
| 2,989,857 | 6/1961 | Helland et al. | 64/9 |

*Primary Examiner*—Charles J. Myhre
*Assistant Examiner*—Randall Heald
*Attorney*—Robert T. Gammons

[57] ABSTRACT

A flexible coupling for connecting the adjacent ends of shafts, comprising hubs adapted to be non-rotatably fixed to the adjacent ends of the shafts, said hubs providing radially spaced concentric bearing members, containing peripherally spaced, longitudinally extending opposed grooves within which are mounted roller bearings and walls at the end of the bearing members for retaining said roller bearings in the grooves and the inner bearing member within the outer bearing member, said grooves being of uniform cross-section from end-to-end and said roller bearings being shorter than the distance between the walls and tapering from a maximum diameter at their midlengths toward their ends.

1 Claim, 4 Drawing Figures

Patented May 1, 1973
3,729,953
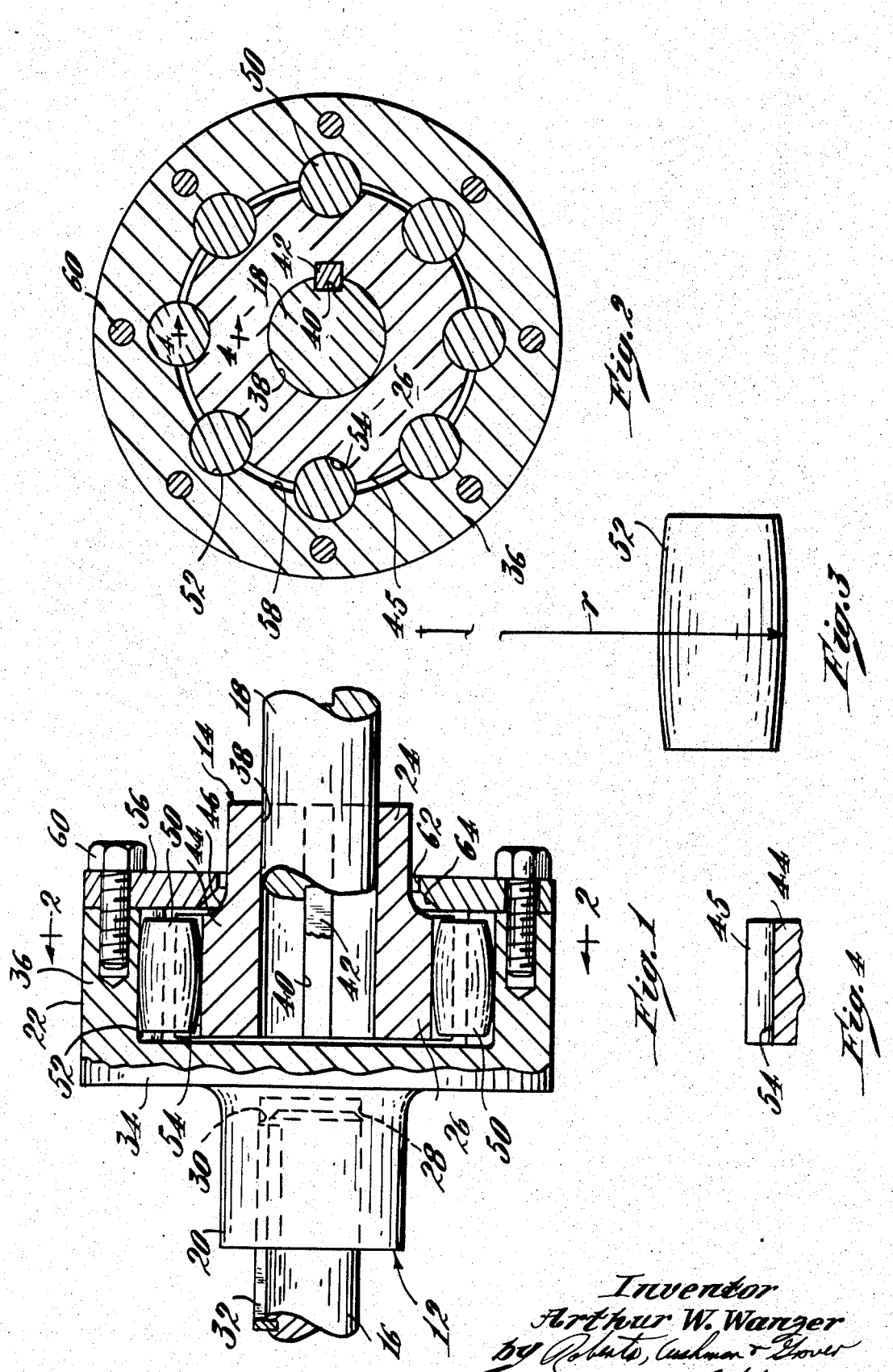

COUPLING FOR CONNECTING THE ADJACENT ENDS OF SHAFTS

It is noted that application 227,224 is a substitute for application 14,337 abandoned Jan. 19, 1972.

BACKGROUND OF THE INVENTION

Flexible couplings for joining the adjacent ends of shafts to provide for varying degrees of misalignment and/or relief of transmission of shock from one driven shaft to another are old in the art. Some embody universal type joints in which ball bearings are employed or ball and socket elements are used and others embody yieldable parts, for example, rubber or rubber-like blocks or links. Such prior couplings as are available of the foregoing type while affording to a degree the flexibility required, embody certain disadvantages especially with respect to maximum power transmission and uniformity in transmission of power, longevity, maintenance and high cost of manufacture. The coupling which forms the subject matter of this invention is designed especially to transmit maximum power without failure and to insure uniform transmission of the power.

SUMMARY

As herein illustrated, the coupling comprises hubs fixed to the adjacent ends of two shafts, one of which is to drive the other, which, in conjunction, provide outer and inner bearing members having concentric confronting bearing surfaces containing circumferentially thereof spaced pairs of opposed grooves of arcuate cross-section. Rigid roller bearings are disposed in each pair of opposed grooves and there are means at the ends of the bearing members for holding the inner bearing member within the outer bearing member and the roller bearings within the grooves. The inner bearing member is axially shorter than the outer bearing member, the grooves are of uniform cross-section from end-to-end and the rigid roller bearings are shorter than the grooves in the inner bearing member and taper from their midlengths toward their ends. More specifically, the hubs are bored and slotted to receive the adjacent ends of the shafts and splines for fixing them to the shafts. One hub has at the end adjacent the other an integral radial flange of larger diameter than the hub which supports the outer bearing member and the other hub has at the end adjacent the one hub an integral cylindrical head of larger diameter than the hub which comprises the inner bearing member. The outer bearing member is in the form of a hollow cylindrical flange having an inside diameter greater than the outside diameter of the inner bearing member and extends axially from the flange in concentric telescoping relation to the inner bearing member. The means for retaining the inner bearing member in the outer bearing member comprises the aforesaid radial flange on the one hub and a retainer plate secured to the distal end of the outer bearing member in overlapping relation to the shoulder at the junction of the inner bearing member and its hub.

The invention will now be described in greater detail with reference to the accompanying drawings wherein:

FIG. 1 is an elevation of the coupling partly in section showing the component parts thereof fastened to the adjacent ends of aligned shafts, one of which is to be driven by the other;

FIG. 2 is a diametrical section taken on the line 2—2 of FIG. 1;

FIG. 3 is an elevation of a single roller bearing to much larger scale; and

FIG. 4 is a fragmentary section taken on the line 4—4 of FIG. 2.

Referring to the drawings, the coupling 10 comprises adapters 12 and 14 secured to the adjacent ends of shafts 16 and 18. Each adapter comprises a hub and bearing 20, 22 and 24, 26 respectively.

The hub 20 contains an axial hole 28 and a slot 30 for receiving the shaft 16 and a key or spline 32. The bearing 22 is integral with one end of the hub, is cup-shaped, comprising a circular flange 34 extending radially from the hub and an annular flange 36 extending from the circular flange in concentric relation to the axis of the hub. The hub 24 contains an axial hole 38 and a slot 40 for receiving the end of the shaft 18 and a key or spline 42 for fixing it to the shaft. The bearing 26 is integral with one end of the hub 24 and comprises a cylindrical head 44 concentric with the axis of the hub. At the junction of the head and hub there is a radially extending shoulder 46.

The head 44 has an outside diameter which is smaller than the inside diameter of the annular flange 36, is shorter in axial length and is supported internally of the annular flange in concentric relation thereto by a plurality of roller bearings 50 disposed in confronting grooves 52 and 54 in the bearing surfaces and by a retainer plate 56 secured to the distal end of the annular flange in overlapping relation to the shoulder 46 at the junction of the head with the hub.

The inner surface 58 of the annular flange is of uniform diameter lengthwise and the peripherally disposed grooves 52 are of arcuate cross-section and uniform depth from end-to-end. The outer surface of the head 44 (FIG. 4) is of uniform diameter from end-to-end and contains the peripherally disposed grooves 54 which are of arcuate cross-section and of uniform depth from end-to-end.

The middiameters of the roller bearings 52 correspond substantially precisely with the difference between the radial distance from the axis of the hub 24 to the bottoms of the grooves 54 in the head 44 and the axis of the hub 20 and the bottoms of the grooves 52 in the annular flange 36. The roller bearings 52 taper upwardly from their middiameters toward their ends and are shorter in length than the grooves in the heads. The taper is on a radius $r$ (FIG. 3) which is greater than the maximum diameter of the roller bearings.

The retainer plate 56 is circular, is fastened to the distal end of the annular flange by bolts 60 and contains centrally thereof a hole 62 which is larger in diameter than the hub but smaller in diameter than the shoulder 46, the inner side of which is beveled at 64.

As related above, the head 44 is shorter in length than the annular flange 22 so that the head is free to move axially relatively to the annular flange a limited amount and at the same time the head is permitted to rock out of straight line alignment with the annular flange by reason of the tapered configuration of the roller bearings and the clearance between the hole 62 in the retainer plate and the hub 24. Axial movement of the head is limited by the flange 34 and retainer plate 56. As illustrated, there is a clearance at each end of the head in the order of 0.05 inches; however, this will vary with the size of the coupling.

The aforesaid construction affords rigidity and positive transmission from one adapted to the other through the rigid roller bearings in contrast to elastic bearings which cannot be depended upon to carry power through a coupling uniformly especially if there is any tendency for vibration in the transmission of power and in contrast to ball bearing couplings it is easier and cheaper to manufacture and maintain.

It should be understood that the present disclosure is for the purpose of illustration only and that this invention includes all modifications and equivalents which fall within the scope of the appended claims.

I claim:

1. A coupling for drivably connecting the adjacent ends of aligned shafts comprising hubs containing holes adapted to be non-rotatably mounted on the ends of the shafts, a radial flange integral with one of said hubs, an axial flange integral at one end with the radial flange, said axial flange having at its distal end a plurality of circumferentially spaced threaded holes, an annular retainer plate corresponding in diameter to the distal end of the axial flange containing a center hole and peripherally located holes corresponding to those at the distal end of said axial flange, bolts securing said retainer plate to said axial flange, said radial flange, axial flange and retainer plate collectively forming a cylindrical chamber at said end of the hub, having an interior cylindrical wall concentric with the axis of the shafts constituting an inner bearing surface and axially spaced end walls perpendicular to the axes of the shafts; a cylindrical part at the end of the other of said hubs connected thereto by a radial shoulder, said cylindrical part being of smaller diameter than said inner bearing surface but of larger diameter than the center hole in the retainer plate, said cylindrical part being axially shorter than the said axially spaced end wall and having axially spaced parallel ends parallel to said end walls and spaced therefrom, the cylindrical surface intermediate said ends constituting an outer bearing surface in concentric relation with said inner bearing surface, said outer and inner bearing surfaces containing circumferentially spaced, semi-cylindrical, axially disposed grooves which collectively define axially disposed pockets of circular cross-section and of uniform diameter, rigid bearing elements disposed in said pockets which are of circular cross-section and taper from a maximum diameter midway between their ends corresponding to the diameters of the pockets to a lesser diameter at their ends, said bearing elements being axially shorter than the distance between said end walls of the chamber and the ends of said cylindrical part and permitting axial and angular displacement of the hubs relative to each other within predetermined limits and said hole in the retainer plate being of larger diameter than the shoulder at the junction of the hub and the cylindrical portion and flaring at the inner side of the retainer plate from a diameter corresponding substantially to that of the hub to a diameter corresponding substantially to the diameter of the root line of the grooves in said cylindrical part.

* * * * *